US010840817B1

(12) United States Patent
Chopra et al.

(10) Patent No.: US 10,840,817 B1
(45) Date of Patent: Nov. 17, 2020

(54) SYSTEMS AND METHODS OF SYNCHRONOUS RECTIFICATION IN ACTIVE CLAMP FLYBACK POWER CONVERTERS

(71) Applicant: SEMICONDUCTOR COMPONENTS INDUSTRIES, LLC, Phoenix, AZ (US)

(72) Inventors: Dhruv Chopra, Gilbert, AZ (US); Tomas Tichy, Roznov pod Radhostem (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/674,272

(22) Filed: Nov. 5, 2019

Related U.S. Application Data
(60) Provisional application No. 62/915,734, filed on Oct. 16, 2019.

(51) Int. Cl.
*H02M 3/335* (2006.01)
(52) U.S. Cl.
CPC ............................... *H02M 3/33592* (2013.01)
(58) Field of Classification Search
CPC ........ H02M 3/22; H02M 3/325; H02M 3/335; H02M 3/3353; H02M 3/33592; H02M 3/33576
See application file for complete search history.

(56) References Cited

U.S. PATENT DOCUMENTS

| 10,158,297 | B1* | 12/2018 | Gong | H02M 3/33592 |
| 2014/0112030 | A1* | 4/2014 | Fahlenkamp | H02M 3/335 363/21.14 |
| 2014/0268914 | A1* | 9/2014 | Wang | H02M 3/33592 363/21.13 |
| 2016/0111961 | A1* | 4/2016 | Balakrishnan | H02M 3/33507 363/21.12 |
| 2017/0047855 | A1* | 2/2017 | Yang | H02M 3/33592 |
| 2019/0222131 | A1* | 7/2019 | King | H02M 3/33592 |

(Continued)

OTHER PUBLICATIONS

"Ac-Dc Active Clamp Flyback PWM IC," on Semiconductor Product Description Publication No. NCP1568, Feb. 2019—Rev. P4, 42 pages, Copyright Semiconductor Components Industries, LLC.

(Continued)

*Primary Examiner* — Adolf D Berhane
(74) *Attorney, Agent, or Firm* — Dickinson Wright PLLC; Mark E. Scott

(57) ABSTRACT

Synchronous rectification in active clamp flyback power converters. At least some example embodiments are methods including: sensing, based on a rate of change of voltage on a drain of a synchronous rectifier field effect transistor (SR FET), that the power converter has entered a charge mode of a transformer arranged for flyback operation; changing, responsive the sensing, a parameter within a SR driver from an original state to a modified state, the SR driver coupled to the SR FET; making the SR FET conductive during a discharge mode of the transformer; sensing, based on a voltage at the drain of the SR FET, that the discharge mode of the converter has ended; returning, responsive to sensing that the discharge mode has ended, the parameter to the original state.

33 Claims, 4 Drawing Sheets

(56) References Cited

U.S. PATENT DOCUMENTS

2020/0036280 A1* 1/2020 Yang ................. H02M 3/33523
2020/0153327 A1* 5/2020 Lin ......................... H02M 1/44

OTHER PUBLICATIONS

"Secondary Side Sychronous Rectification Driver for High Efficiency SMPS Topologies," on Semiconductor Product Description Publication No. NCP4306, Dec. 2018—Rev. 5, 56 pages, Copyright Semiconductor Components Industries, LLC.

\* cited by examiner

US 10,840,817 B1

SYSTEMS AND METHODS OF SYNCHRONOUS RECTIFICATION IN ACTIVE CLAMP FLYBACK POWER CONVERTERS

CROSS-REFERENCE TO RELATED APPLICATIONS

This application claims the benefit of U.S. Provisional Patent Application No. 62/915,734, filed on Oct. 16, 2019, the entire contents of which is incorporated herein by reference.

BACKGROUND

Active clamp flyback (ACF) power converters use a resonant or quasi-resonant primary circuit that operates during continuous conduction mode (CCM) to not only transfer energy associated with leakage inductance to the secondary side, but also to strive for zero volt switching (ZVS) of the main field effect transistor (FET) on the primary side. ACF power converters can achieve high efficiency at high loads, but the ACF operation may be curtailed during low loads when the power converter shifts to a discontinuous conduction mode (DCM). Shifting between DCM operation and ACF operation may cause issues with a driver for the secondary-side synchronous rectifier. That is, the driver for the secondary-side synchronous rectifier may have difficulty distinguishing between the transformer entering a charge mode on the one hand, and the ACF circuit becoming active on the other hand.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Controller" shall mean, alone or in combination, individual circuit components, an application specific integrated circuit (ASIC), a microcontroller with controlling software, a digital signal processor (DSP), a processor with controlling software, or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to systems and methods of active clamp flyback power converters. More particularly, example embodiments are directed to a driver for a secondary-side synchronous rectifier that can distinguish between a primary field effect transistor (FET) on the primary side becoming conductive on the one hand, and a clamp FET on the primary side becoming conductive on the other hand. More particularly still, example embodiments distinguish between the primary FET becoming conductive and the clamp FET becoming conductive based on a rate of change of voltage on the secondary side. The specification first turns to an example active clamp flyback power converter, and its operation, to orient the reader.

Figure 1:
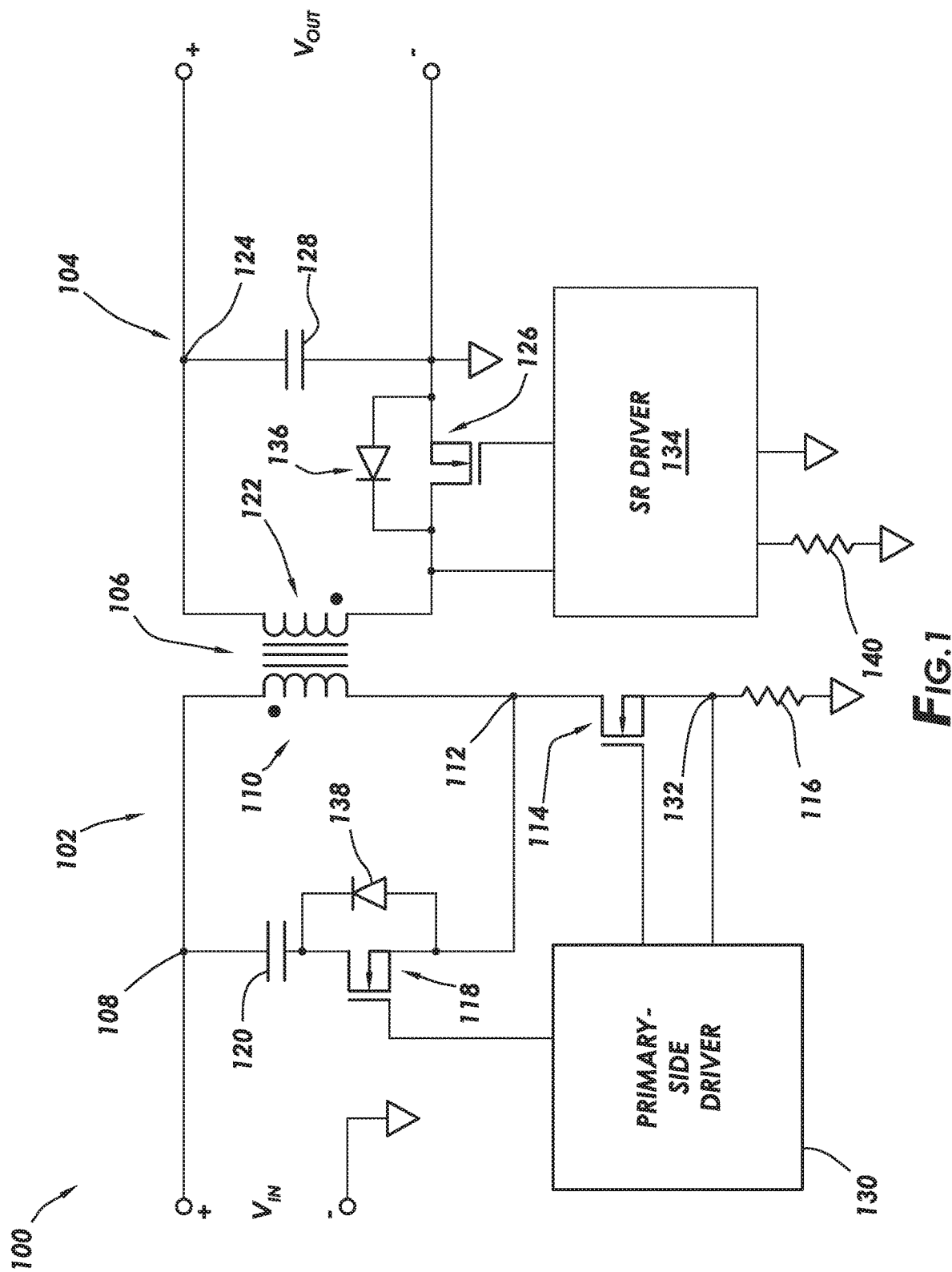
FIG. 1 shows a schematic diagram of an active clamp flyback power converter in accordance with at least some embodiments.

FIG. 1 shows a schematic diagram of an active clamp flyback power converter in accordance with at least some embodiments. In particular, the power converter 100 comprises a primary circuit or primary side 102 electrically coupled to a secondary circuit or secondary side 104 by way of a transformer 106. The primary side 102 defines a node 108 that couples to a direct current (DC) input voltage $V_{IN}$. In the example system the node 108 also couples directly to a first lead of a primary winding 110 of the transformer 106. The second lead of the primary winding 110 couples to a switch node 112. The switch node 112 (and thus the second lead of the primary winding 110) couples to a primary FET 114. The drain of the primary FET 114 couples to the switch node 112, and the source of the primary FET 114 couples to common or ground on the primary side 102 by way of a sense resistor 116. The switch node 112 also couples to the source of a clamp FET 118. The drain of the clamp FET 118 couples to a first lead of a clamp capacitor 120, and the second lead of the clamp capacitor 120 couples to the node 108. In example systems the primary FET 114 and the clamp FET 118 are N-channel metal oxide semiconductor (MOS) FETs. However, in other example cases the primary FET 114 and clamp FET 118 may be P-channel MOSFETs, or any other suitable device that operates as an electrically controlled switch, including FETs referred to as "super-junction" (SJFETs), and higher performance gallium nitride (GaN) FETs.

In example systems, the primary side 102 comprises a primary-side driver 130. The primary-side driver 130 couples to: the gate of the primary FET 114; the gate of the clamp FET 118; and a sense node 132 defined between the primary FET 114 and the sense resistor 116. Additional connections to the primary-side driver 130 may be present (e.g., ground on the primary side, a connection to the input voltage $V_{IN}$, and a voltage feedback connection), but the additional connections are not shown so as not do unduly complicate the figure.

The example secondary side 104 comprises a secondary winding 122 of the transformer 106. A first lead of the secondary winding 122 couples to an output node 124 of the secondary side 104 and thus the positive terminal of the output voltage $V_{OUT}$. The second lead of the secondary winding 122 couples to a synchronous rectifier in the example form a FET (hereafter SR FET 126). In particular, the second lead of the secondary winding 122 couples to the drain of SR FET 126, and the source of SR FET 126 couples to common on the secondary side 104. The example secondary side 104 also comprises a capacitor 128 coupled between the output node 124 and common for the secondary side 104, which common need not be the same as the ground for the primary side 102 because of the isolation aspects of the transformer 106.

Further in the example system, the secondary side 104 comprises a synchronous rectifier driver 134 (hereafter SR driver 134). The SR driver 134 couples to the gate of the SR FET 126, and also couples to the drain of the SR FET 126. By monitoring the voltage on the drain of the SR FET 126, the SR driver 134 controls when the SR FET 126 is conductive and non-conductive, as discussed more below. The example system further comprises a resistor 140 coupled to the SR driver 134. As will be discussed more below, the resistance of the resistor 140 may set or be proportional to a minimum conduction time of the SR FET 126. The specification now turns to various operational states or modes of the power converter 100.

Transferring energy from the primary side 102 to the secondary side 104 in the example systems is conceptually a two-step process. In particular, the power converter 100 first enters a charge mode where energy is stored in the field of the transformer 106. More particularly, the example power converter 100 enters the charge mode by the primary-side driver 130 making the primary FET 114 conductive. When the primary FET 114 is conductive, current flows from the input voltage $V_{IN}$, through the primary winding 110, through the primary FET 114, through the sense resistor 116, and then to ground on the primary side 102. The current through the primary winding 110 creates a voltage on the secondary winding 122. However, the transformer 106 is arranged for flyback operation, and during the charge mode the voltage on the secondary winding 122 is higher on the connection or lead coupled to the drain of the SR FET 126 than on the connection or lead coupled to the output node 124 (in conformance with the dot convention shown in the figure). During the charge mode the SR FET 126 is non-conductive, the body diode 136 of the SR FET 126 is reversed biased, and thus no current flows in the secondary winding 122; rather, energy is stored in the field of the transformer 106 during the charge mode. When the current through the primary winding 110 reaches a peak current setpoint (as determined by the primary-side driver 130 sensing voltage at the sense node 132), the primary-side driver 130 makes the primary FET 114 non-conductive, thus ending the charge mode and beginning the discharge mode.

The second step in transferring energy is the discharge mode. Once the primary FET 114 is made non-conductive, the voltage on the secondary winding 122 reverses polarity, and current flows through the secondary winding 122 to the output node 124 (e.g., to charge the capacitor 128, to supply a load (not specifically shown), or both). The period of time in which current is flowing through the secondary winding is referred to as the discharge mode. That is, the energy stored during the previous charge mode (when no current flows in the secondary winding 122) is provided from the transformer 106 in the form of voltage and current at the secondary winding 122 during the discharge mode. More particularly still, the collapsing field associated with the transformer 106 provides voltage and current to the secondary winding 122 during the discharge mode. In some cases, the SR driver 134 may sense a rate of change of voltage on the drain of the SR FET 126, and predictively start the process of driving the SR FET 126 to a conductive state. That is, when the rate of change of voltage on the drain of the SR FET 126 is falling, such may be indicative of an impending discharge mode. In other cases, the SR driver 134 may sense a threshold voltage on the drain of the SR FET 126, and make the SR FET 126 conductive based on the threshold. Initially the current flow through the secondary winding 122 may flow through the body diode 136 of the SR FET 126, and soon thereafter the SR driver 134 makes the SR FET 126 fully conductive so that current flows through the SR FET 126. After the discharge mode ends a new charge mode begins, and the cycle continues with each charge mode and related discharge mode used transfer energy across the transformer 106 and to the output voltage $V_{OUT}$.

The example power converter 100 may operate in various conduction modes of the transformer 106. More particularly, the example power converter 100 may operate in either a continuous conduction mode (CCM) or a discontinuous conduction mode (DCM). Considering first the continuous conduction mode, which may be used during high loads. In the continuous conduction mode current flows through either the primary winding 110 or the secondary winding 122 at all times. For example, in the continuous conduction mode each discharge mode of the transformer 106 ends prior to the field associated with the transformer 106 fully collapsing. More particularly still, in the continuous conduction mode the primary-side driver 130 makes the primary FET 114 conductive, thus beginning the next charge mode, before the current flow in the secondary winding 122 reaches zero in the discharge mode. Even though current may still be flowing in the secondary winding 122 at the instant the primary FET 114 begins the transition to being conductive, as soon as current starts to flow in the primary winding 110 the voltage on the secondary winding 122 reverses. When the SR driver 134 senses the voltage change (e.g., by monitoring the voltage on the drain of the SR FET 126), the SR driver 134 makes the SR FET 126 non-conductive.

Still referring to FIG. 1, the active clamp flyblack aspects of the example power converter 100 are utilized during the continuous conduction mode. In particular, during discharge modes of the continuous conduction mode the clamp FET 118 is made conductive to provide a path for current flow associated with the leakage inductance of the primary winding 110 (the leakage inductance not specifically shown). That is, as the current flows in the secondary winding 122 during a discharge mode, current may also initially flow through the clamp FET 118 to the clamp capacitor 120. However, the clamp capacitor 120 and parasitic capacitance associated with the primary FET 114 (the parasitic capacitance not specifically shown) form a tank circuit with the leakage inductance. While initially the resonant current flows through the clamp FET 118 to the clamp capacitor 120, eventually the resonant current flow associated with the tank circuit reverses direction. The example power converter 100 uses the resonant current, particular the current flow from the clamp capacitor 120, to drain or discharge the parasitic capacitance associated with the primary FET 114 to achieve zero volt switching (ZVS) operation during the continuous conduction mode.

Now consider the discontinuous conduction mode, which may be used during light or low loads. In the discontinuous conduction mode current flow in the secondary winding 122 reaches zero, and remains at zero for a period of time before the next charge mode begins. Thus, unlike the continuous conduction mode, in the discontinuous conduction mode there are periods of time when no current is flowing in either the primary winding 110 or the secondary winding 122 (not considering parasitic oscillations). More particularly still, in the discontinuous conduction mode the current in the secondary winding 122 reaches zero, and responsive thereto the SR driver 134 makes the SR FET 126 non-conductive. However, because of the reactive components on both the primary side 102 and the secondary side 104, various parasitic oscillations occur. For example, after the current in the secondary winding 122 reaches zero (i.e., the field associated with the transformer 106 has fully collapsed), the voltage at the switch node 112 on the primary side 102 starts to oscillate. A similar oscillation occurs at the drain of the SR FET 126.

In the discontinuous conduction mode the next charge mode may begin at any time after the current in the secondary winding 122 reaches zero. In example embodiments the next charge mode begins in a "valley" of the oscillation of the voltage at the switch node 112. That is, the primary-side driver 130 may monitor voltage at the switch node 112 in any suitable form, such as by way of a dedicated connection to the switch node 112 (not specifically shown), or by monitoring voltage induced on the gate of the primary FET 114 caused by the oscillations. When the voltage reaches or approaches a low voltage "valley" as part of the oscillation, the primary-side driver 130 may make primary FET 114 conductive again, starting the next charge mode. Making the primary FET 114 conductive in a valley of the voltage oscillation reduces the voltage across the primary FET 114 which reduces switching losses associated with the primary FET 114. Moreover, switching in a valley may also be consider a ZVS operation. Thus, in the discontinuous conduction mode the clamp FET 118 and clamp capacitor 120 are not needed to achieve ZVS operation of the primary FET 114. It follows that in the discontinuous conduction mode the primary-side driver 130 holds the clamp FET 118 in a non-conductive state.

When transitioning from a highly loaded state or condition (and operating in the continuous conduction mode) to a lightly loaded state or condition (and thus changing to the discontinuous conduction mode), the primary-side driver 130 may cease use of the active clamp flyback components when the discontinuous conduction mode begins. However, because of the body diode 138 associated with the clamp FET 118, a voltage may be accumulated on the clamp capacitor 120 over time. For example, during discharge modes the voltage at the switch node 112 is the sum of the input voltage $V_{IN}$ and a reflected voltage in the form of the output voltage $V_{OUT}$ reflected across the transformer 106 (with the magnitude of the reflected voltage based on the turns ratio of the transformer 106). Because of the rectifying action of the body diode 138 even when the clamp FET 118 is not in use, the voltage on the clamp FET 118 eventual matches the highest voltage on the switch node 112. The issue may be exacerbated by parasitic oscillations at the switch node 112 whose magnitude may be higher even than the sum of the input voltage $V_{IN}$ and the reflected voltage. The voltage on clamp capacitor 120 accumulated during the discontinuous conduction mode does not become a problem until the power converter 100 transitions from the lightly loaded condition (still in the discontinuous conduction mode) to the highly loaded condition (which begins anew the continuous conduction mode). The example primary-side driver 130 addresses the issue of the voltage on clamp capacitor 120 accumulated during the discontinuous conduction mode by activating the clamp FET 118 during the discontinuous conduction mode, albeit the activation for reduced periods of time, as the power converter 100 transitions back to the continuous conduction mode.

Figure 2:
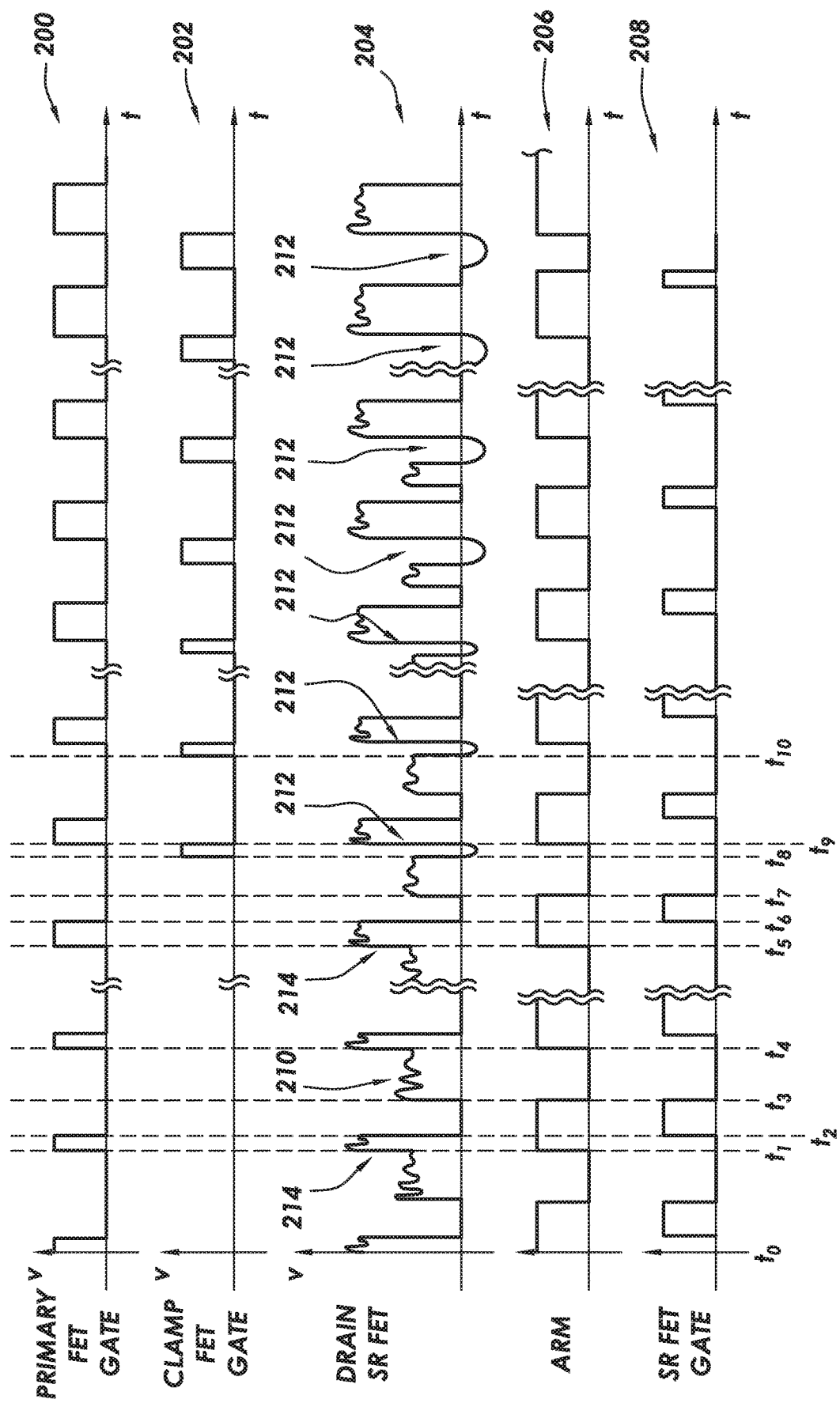
FIG. 2 shows a timing diagram in accordance with at least some embodiments.

FIG. 2 shows a timing diagram in accordance with at least some embodiments. That is, FIG. 2 shows a series of waveforms co-plotted and having corresponding time axes as an example power converter 100 transitions from a discontinuous conduction mode towards a continuous conduction mode (but the plots do not show operation in continuous conduction mode). The time frames for making the noted transition as shown in FIG. 2 are not necessarily to scale. In particular, plot 200 of FIG. 2 shows a gate signal applied to the primary FET 114. The example gate signal is shown asserted high, but such should not be read as a limitation. In the example time frames shown, the duration of the charge mode (i.e., the duty cycle of the gate signal in plot 200) increases over time illustrating increased energy storage in the field of the transformer 106 over time.

Plot 202 of FIG. 2 shows a gate signal applied to the clamp FET 118. The example gate signal is shown asserted high, but such should not be read as a limitation. In the example time frames shown, initially the gate signal applied to clamp FET 118 remains de-asserted (e.g., between time t0 and t8). However, starting in the period associated with the charge mode beginning at time t5, following the discharge mode (between times t6 and t7) the gate signal to the clamp FET 118 is asserted (at time t8) for a short period of time in the dead zone between ending of the discharge mode and the beginning of the next charge mode. The assertion of the gate signal to the clamp FET 118 makes the clamp FET 118 conductive to begin the process of draining the accumulated charge on the clamp FET 118 in preparation for the forthcoming continuous conduction mode. Thus, over the time frames shown in FIG. 2, the duration of activation of the clamp FET 118 increases with increasing duty cycle of the gate signal (plot 200) applied to the primary FET 114. When the example power converter 100 reaches continuous conduction mode, the clamp FET 118 may be conductive at all times when the primary FET 114 is non-conductive, with the exception of dead times between conductive states of the clamp FET 118 and the primary FET 114 to ensure there is no cross-conduction of the clamp capacitor 120 to ground on the primary side 102.

Plot 204 of FIG. 2 shows voltage at the drain of the SR FET 126. Consider, as an example, the time frame between times t1 and t2, representing the second charge mode shown in the timing diagram of FIG. 2. During the example charge mode, the voltage at the drain of the SR FET 126 (keeping in mind that the SR FET 126 is non-conductive during charge modes) is the voltage transferred across the transformer 106. Because the transformer 106 is arranged for flyback operation, the voltage on the drain is higher than the voltage on the source of the SR FET 126, and thus the body diode 136 is reversed biased and no current flows. As soon as the primary FET 114 is made non-conductive (at time t2), the discharge mode begins. The example discharge mode begins at time t2, and ends at time t3. During the example discharge mode the SR driver 134 makes the SR FET 126 conductive, and thus the voltage at the drain is low or zero as shown. Keeping in mind that the various time frames of FIG. 2 are all with respect to discontinuous conduction mode, at time t3 the current the secondary winding 122 reaches zero, ending the discharge mode. The example SR driver 134 thus makes the SR FET 126 non-conductive, and the voltage at the drain of the SR FET 126 oscillates in the dead zone between times t3 and t4 as illustrative shown at 210. The oscillation is based on the interaction of various reactive elements on both sides of the transformer (e.g., capacitor 128, and leakage and magnetizing inductances of the primary winding 110). The process starts anew with the next charge mode at time t4.

In first few time frames, the primary-side driver 130 refrains from activating the active clamp and thus refrains from making the clamp FET 118 conductive. However, in the example time frames starting at time t8, the primary-side driver 130 makes the clamp FET 118 conductive in each period in the dead zone between ending of the discharge mode and beginning of the next charge mode. For example, in the dead zone between times t7 and t9, the example primary-side driver 130 makes the clamp FET 118 conductive at time t8 as shown by the plot 202. Activating the active clamp circuit during the dead zone causes a drop in voltage at the drain of the SR FET 126 as shown by voltage drop 212. In each of the time frames from time t8 on, each time the clamp FET 118 is made conductive there is corresponding drop in voltage on the drain of the SR FET 126. Each voltage drop is illustratively labeled as 212 in FIG. 2.

The inventors of the present specification have found that related-art SR drivers have difficulty distinguishing the voltage drop associated with making the clamp FET 118 conductive during the dead zones (voltage drops 212) from voltage drops that signal the beginning of discharge modes. When a related-art SR driver falsely senses the voltage drop 212 as the beginning of a discharge mode, the related-art SR driver may make the SR FET conductive at inappropriate times (e.g., during a charge mode). Related-art SR drivers may attempt to address this issue using various minimum off-times associated the SR FETs, but minimum off-times are difficult to establish for power converters that switch back and forth between continuous conduction mode and discontinuous conduction mode. For example, a minimum off time long enough to avoid false sensing during lightly loaded conditions may make the power converter inoperable if used during highly loaded conditions operating in continuous conduction mode.

In order to at least in part address the noted issues, various example embodiments sense, based on a rate of change of voltage on a drain of the SR FET 126, that the power converter has entered a charge mode. When a charge mode is sensed, the example SR driver 134 changes a parameter within the SR driver from an original state to a modified state. The changing of the state of the parameter reduces issues caused by activation of the clamp FET 118 during the dead zones of discontinuous conduction modes, and in some cases may eliminate the issues all together. In one example embodiment, the change of state of the parameter is arming the SR driver 134 based on a rate of change of voltage on a drain of the SR FET 126, where the rate of change indicates the power converter 100 has entered a charge mode. When the SR driver 134 arms, the SR driver 134 is thus placed in or transitions to an armed mode. During the armed mode, and only during the armed mode, the SR driver 134 may make the SR FET 126 conductive. Disarming the SR driver 134 may take place at the end of each discharge mode. When the SR driver 134 disarms, the SR driver 134 is thus placed in or transitions to a disarmed mode. During the disarmed mode (i.e., during the dead zone), the SR driver 134 cannot make the SR FET 126 conductive regardless of the voltage sensed on the drain of the SR FET 126. In this way, the SR driver 134 is not armed during periods of time that the clamp FET 118 may be made conductive during the dead zone between the end of a discharge mode and the beginning of the next charge mode, avoiding the possibility that the SR driver 134 may inadvertently make the SR FET 126 based on voltage drops 212.

Referring again to FIG. 2. Plot 206 shows an example armed signal that illustrates periods of time in which the example SR driver 134 is armed in relation to each example charge mode, discharge mode, and dead zone. Plot 206 shows the armed signal for purposes of explanation, but depending on the implementation such an armed signal need not be created specifically for the purpose. For example, being armed may be a first state or states of a state machine within the SR driver 134, and being disarmed may be a second state or states of the state machine implemented within the SR driver 134. It follows that the armed signal may be a bit or a series of bits that identify the state of the state machine. Plot 208 of FIG. 2 shows a gate signal applied to the SR FET 126 for the various time frames shown in the figure. Consider again, as an example, the time frame between times t1 and t2, representing the second charge mode shown in the timing diagram of FIG. 2. In accordance with example embodiments, the SR driver 134 is armed (e.g., the armed signal is asserted) based on the power converter 100 entering the charge mode. More specifically, the example SR driver 134 monitors the voltage on the drain of the SR FET 126, and based on the rate of change of voltage on a drain the SR FET 126 the SR driver 134 is thus placed in or transitions to the armed mode, as shown by plot 206. The example SR driver 134 makes the determination to arm based on rate of change of the voltage (e.g., the slope, or the first derivative of the voltage as a function of time (dV/dt)) at the drain of the SR FET 126 being positive and the rate of change being above a predetermined threshold. That is, the very sharp transition of the voltage on the drain the SR FET 126 (e.g., voltage spike 214) indicates the beginning of a charge mode, and that voltage spike 214 is distinguishable from other voltage swings based on the rate of change of the voltage, the magnitude of the rate of change of the voltage, and/or the polarity or sign of the rate of change. For example, the voltage spike 214 has a positive slope where the magnitude of the slope is higher than any other voltage transition sensed on the drain of the SR FET 126. The rate of change of the voltage associated with voltage spike 214 is not a resonant effect; rather, the rate of change of voltage is the reaction of the transformer 106 to the direction and rate of change of current through the primary winding 110 when the primary FET 114 becomes conductive, and thus the rate of change of voltage is higher than resonant current flows in system and is distinguishable for that reason.

Now referring to times t1 to t3. During the example time period t1 to t3, the example SR driver 134 is in the armed mode as shown by plot 206. During the armed mode, the SR driver 134 makes SR FET 126 conductive during a discharge mode of the transformer. In particular, in example embodiments the SR driver 134 again monitors voltage on the drain of the SR FET 126. As the voltage on the drain of the SR FET 126 drops to zero or near zero (e.g., drops to the forward voltage drop of the body diode 136), the SR driver 134 asserts the gate of the SR FET 126 as shown at time t2. The example SR driver 134 continues to monitor the voltage on the drain of the SR FET 126, and when the voltage rises at time t3, indicating the end of the discharge mode, the gate of the SR FET 126 is de-asserted. More particularly, when the rate of change of voltage at the drain of the SR FET 126 is positive and/or a voltage on the drain rises above a predetermined value, the example SR driver 134 is placed in or transitions to the disarmed mode (e.g., the armed signal is de-asserted).

In the dead zone between times t3 and t4, the SR driver 134 again monitors the voltage on the drain of the SR FET 126. The example SR driver 134 again arms when the rate of change of voltage is positive and above the predetermined value (at time t4). It follows that voltage events in the dead zone between times t3 and t4 cannot result in the SR driver 134 making the SR FET 126 conductive. However, in the example dead zone between times t3 and t4 the clamp FET 118 is not made conductive, and thus no significant voltage drops are present.

Now consider a time frame in which the clamp FET 118 is made conductive in the dead zone between ending of a discharge mode and beginning of a charge mode, such as the time frame between time t7 and t9. As before, at time t5 the SR driver 134 is armed based on the rate of change of the voltage being positive and above a predetermined threshold (e.g., voltage spike 214 at time t5). During the example armed mode, the SR driver 134 again monitors voltage on the drain of the SR FET 126. When the voltage on the drain of the SR FET 126 drops to zero or near zero at time t6, the SR driver 134 asserts the gate of the SR FET 126 and the SR FET 126 becomes conductive. The example SR driver 134 continues to monitor the voltage on the drain of the SR FET 126, and when the voltage rises at time t7, indicating the end of the discharge mode, the gate of the SR FET 126 is de-asserted and the example SR driver 134 is placed in or transitions to the disarmed mode.

The dead zone between times t7 and t9, however, has a voltage drop 212 caused by the primary-side driver 130 making the clamp FET 118 conductive. However, the example SR driver 134 is disarmed (e.g., the armed signal is de-asserted), and thus refrains from making the SR FET 126 conductive, when the rate of change of voltage on the drain indicates a clamp FET 118 on a primary side is made conductive (again, voltage drop 212 at time t8). That is, in example embodiments, the SR driver 134 monitors the voltage on the drain of the SR FET 126, and yet remains in the disarmed mode when the rate of change of voltage is negative and below the first predetermined threshold.

Though not specifically shown in FIG. 2, every transition from charge mode to discharge mode, and every transition from discharge mode (or dead zone) to charge mode, creates transient voltages as cause by reactive components. Though the example FIG. 2 shows the voltage at the drain of the SR FET 126 falling to a steady value near zero during the discharge mode, the reactive components (particularly those on the primary side 102) cause transient voltages at the drain of the SR FET 126 during the discharge mode. In order to avoid prematurely making the SR FET 126 non-conductive during a discharge mode, example embodiments of the SR driver 134 implement minimum on-time or minimum conduction time of the SR FET 126 in each discharge mode. In these example embodiments then, once the SR FET 126 is made conductive, the SR FET 126 remains conductive for at least the predetermined on-time, and then SR FET 126 is made non-conductive (and the SR driver 134 is disarmed) when the rate of change of voltage at the drain of the SR FET 126 is positive and a voltage on the drain rises above a second predetermined value.

In additional to, or in place of, arming the SR driver 134 based on a rate of change of voltage on a drain of the SR FET 126, the SR driver 134 may also change a parameter in the form of changing the minimum on-time or minimum conduction time of the SR FET 126 when the rate of change of voltage indicates the power converter 100 has entered a charge mode. Returning the parameter to the original state after sensing that the discharge mode has ended may comprise decreasing the minimum conduction time of the SR FET 126.

Referring again to FIG. 2. Consider again, as an example, the time frame between times t1 and t2, representing the second charge mode shown in the timing diagram of FIG. 2. In accordance with example embodiments, the SR driver 134 is armed based on the power converter 100 entering the charge mode. In addition to arming at time t1, the example SR driver 134 may also increase the minimum conduction time of the SR FET 126. It should be understood that the SR FET 126 is not made conductive at time t1; rather, the parameter within the SR driver 134 that controls or sets the minimum conduction time is changed in the example at time t1. Now referring to times t1 to t3. During times t1 to t3, the SR driver 134 makes SR FET 126 conductive during a discharge mode of the transformer. In particular, in example embodiments the SR driver 134 again monitors voltage on the drain of the SR FET 126. As the voltage on the drain of the SR FET 126 drops to zero or near zero (e.g., drops to the forward voltage drop of the body diode 136), the SR driver 134 asserts the gate of the SR FET 126 as shown at time t2. The example SR driver 134 keeps the SR FET 126 conductive for at least the minimum conduction time regardless of the voltage sensed at the drain of the SR FET 126. After the minimum conduction time expires, the SR driver 134 then monitors the voltage at the drain of the SR FET 126 until voltage rises at time t3, indicating the end of the discharge mode, the gate of the SR FET 126 is de-asserted. Thereafter, the example SR driver 134 decreases the minimum conduction time of the SR FET. In the example dead zone between times t3 and t4 the clamp FET 118 is not made conductive, and thus no significant voltage drops are present.

Now consider a time frame in which the clamp FET 118 is made conductive in the dead zone between ending of a discharge mode and beginning of a charge mode, such as the time frame between time t7 and t9. As before, at time t5 the SR driver 134 may be armed based on the rate of change of the voltage being positive and above a predetermined threshold (e.g., voltage spike 214 at time t5), and the SR driver 134 increases the minimum conduction time. The SR driver 134 again monitors voltage on the drain of the SR FET 126. When the voltage on the drain of the SR FET 126 drops to zero or near zero at time t6, the SR driver 134 asserts the gate of the SR FET 126 and the SR FET 126 becomes conductive. The example SR driver 134 keeps the SR FET 126 conductive for at least the minimum conduction time regardless of the voltage sensed at the drain of the SR FET 126. After the minimum conduction time expires, the example SR driver 134 continues to monitor the voltage on the drain of the SR FET 126, and when the voltage rises at time t7, indicating the end of the discharge mode, the gate of the SR FET 126 is de-asserted and the example SR driver 134 decreases the minimum conduction time parameter.

The dead zone between times t7 and t9, however, has a voltage drop 212 caused by the primary-side driver 130 making the clamp FET 118 conductive. In some example cases, however, the SR driver 134 is disarmed and thus refrains from making the SR FET 126 conductive. In other example cases where the SR driver 134 does not implement the arm and disarm strategy, the shortened minimum conduction ensure that, even if the SR FET 126 is made conductive based on voltages induced in the secondary based on the clamp FET 118 becoming conductive, the shorter minimum conduction time will not force the SR FET 126 to be conductive during the discharge mode.

In some example embodiments, increasing the minimum conduction time parameter may comprise reading or sensing resistance of the resistor 140 (FIG. 1) external to and coupled to the SR driver 134. In other cases, increasing the minimum conduction time parameter may comprise reading or sensing any external component (e.g., an external capacitance) that has a parameter that can be sensed by the SR driver 134. In yet still other cases, the increased minimum conduction time parameter may be communicated to a controller within the SR driver 134 as part of a set up operating (e.g., serially transferred into the controller during set up). Similarly, decreasing the minimum conduction time parameter may comprise reading or sensing an external component (e.g., resistor, capacitor) that has a parameter that can be sensed by the SR driver 134. In yet still other cases, the decreased minimum conduction time parameter may be pre-set or hard coded within the SR driver 134, or may be communicated to the controller within the SR driver 134 as part of a set up operating (e.g., serially transferred into the controller during set up).

Figure 3:
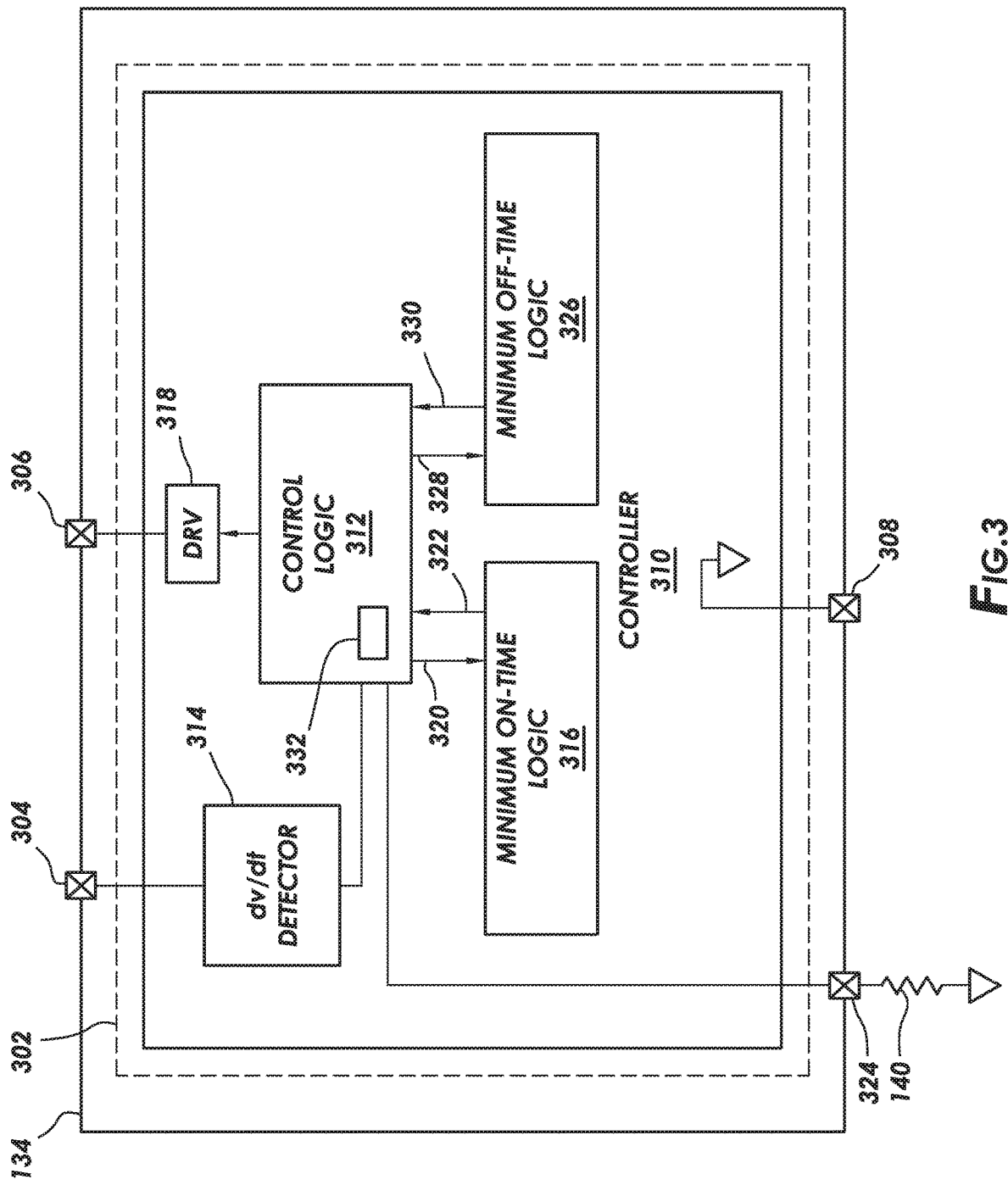
FIG. 3 shows a block diagram of a secondary driver in accordance with at least some embodiments.

FIG. 3 shows a block diagram of an SR driver in accordance with at least some embodiments. In particular, the SR driver 134 may comprise one more electrical devices monolithically created on a substrate 302 and encapsulated within packaging; however, the functionality of the controller 190 may be embodied on multiple substrates co-packaged and electrically coupled to each other and the various terminals. The packaging may take any suitable form, such as a small outline integrated circuit (SOIC) eight pin package, or a thin small outline package (TSOP) six pin package. The example SR driver 134 defines a drain-sense terminal 304, a gate terminal 306, a reference terminal 308, and an on-time terminal 324. The example terminals are electrical connections exposed and accessible through packaging. Additional terminals will be present (e.g., power terminal), but these additional terminals are not shown so as not to unduly complicate the figure.

The example SR driver 134 comprises a controller 310 coupled to the drain-sense terminal 304, the gate terminal 306, the reference terminal 308, and various other terminals present. The example controller 310 is configured to change a parameter within the SR driver 134 based on a rate of change of voltage sensed on the drain-sense terminal 304, where the rate of change of voltage indicates a power converter has entered a charge mode of a transformer arranged for flyback operation. The changed parameter may place the driver in an armed mode, change a minimum conduction time, or both. The controller 310 is further configured to assert the gate terminal 306 during a discharge mode of the transformer, and return the parameter to the original state at the end of the discharge mode (e.g., disarm the driver, decrease the minimum conduction time, or both).

More particularly still, the example controller 310 can be conceptually, though not necessarily physically, divided into a control logic 312, a slope detector 314 (shown as "dV/dt Detector" in the figure), a minimum on-time logic 316, and a driver circuit 318. The example control logic 312 receives various signals, and controls various parameters of the SR driver 134. The control logic 312 also drives a gate signal to the gate terminal 306 by way of the driver circuit 318. In particular, the example slope detector 314 monitors the voltage on the drain-sense terminal 304, and provides information regarding the rate of change of the voltage, and possibly other pieces of information (e.g., magnitude) to the control logic 312. The control logic 312, in turn, changes the parameter (e.g., parameter 332). In some cases, parameter 332 arms the SR driver 134 based on a rate of change of voltage sensed by the slope detector 314. That is, when the rate of change of voltage indicates a power converter has entered a charge mode of a transformer arranged for flyback operation, the arming takes place. More particularly, the arming takes place when the rate of change of voltage sensed on the drain-sense terminal 304 is positive and above a first predetermined value.

In other cases, the parameter 332 may be a minimum conduction time parameter. The control logic 312 may increase the minimum conduction time responsive to the sensing that the power converter has entered the charge mode. In one example embodiment, the controller 310 increases the minimum conduction time based a resistance of resistor 140 sensed through the on-time terminal 324. In yet still other cases, the controller 310 may both arm the driver and increase the minimum conduction time parameter.

During the armed mode, the slope detector 314 continues to monitor drain-sense terminal 304 and provide relevant information to the control logic 312. When the voltage on the drain-sense terminal 304 indicates discharge mode is about to begin or has begun, the control logic 312 asserts the gate terminal 306. The example controller 310 keeps the gate terminal 306 asserted for at least the (increased) minimum conduction time regardless of the voltage sensed at the drain-sense terminal 304. The example control logic 312 de-asserts the gate terminal 306, and disarms the SR driver 134, at the end of the discharge mode. In particular, the example control logic 312 de-asserts the gate terminal 306 and disarms the SR driver 134 when the rate of change of voltage sensed at the drain-sense terminal 304 (as sensed by the example slope detector 314) is positive and a voltage on the drain-sense terminal rises above a second predetermined value. Moreover, at the end of the discharge mode the example controller 310 decreases the minimum conduction time parameter.

During the disarmed mode, the example control logic 312 refrains from arming when the rate of change of voltage on the drain-sense terminal 304 (as sensed by the slope detector 314) indicates a clamp FET on a primary side is made conductive. That is, the example control logic 312 monitors a voltage on the drain-sense terminal 304 (by way of the slope detector 314), and the example control logic 312 remains in the disarmed mode when the rate of change of voltage is negative and below the first predetermined threshold.

In some example embodiments, the control logic 312 works with the minimum on-time logic 316. In particular, in some example embodiments the control logic 312 asserts gate terminal 306, and simultaneously communicates the assertion (e.g., as shown by arrow 320). The example control logic 312 keeps the gate terminal asserted until expiration of the minimum conduction time as determined by the minimum on-time logic 316. When the minimum on-time has been achieved, the achievement may be communicated from the minimum on-time logic 316 to the control logic 312, as shown by arrow 322. After the achievement of the minimum on-time, the control logic 312 my resume monitoring voltage on the drain-sense terminal 304, and then de-assert the gate terminal 306 and disarm the SR driver 134 when the rate of change of voltage sensed at the drain-sense terminal 304 (as sensed by the example slope detector 314) is positive and a voltage on the drain-sense terminal rises above a second predetermined value. The control logic 312 may also work with a minimum off-time logic 326. In particular, in some example embodiments the control logic 312 de-asserts gate terminal 306, and simultaneously communicates the de-assertion (e.g., as shown by arrow 328). The example control logic 312 keeps the gate terminal de-asserted regardless of the voltage on the drain-sense terminal 304 until expiration of a minimum off-time as determined by the minimum off-time logic 326. When the minimum off-time has been achieved, the achievement may be communicated from the minimum off-time logic 326 to the control logic 312, as shown by arrow 330. After the achievement of the minimum off-time, the control logic 312 my resume monitoring voltage on the drain-sense terminal 304, and arm the control logic 312 and/or increase the minimum conduction time, as discussed above.

Figure 4:
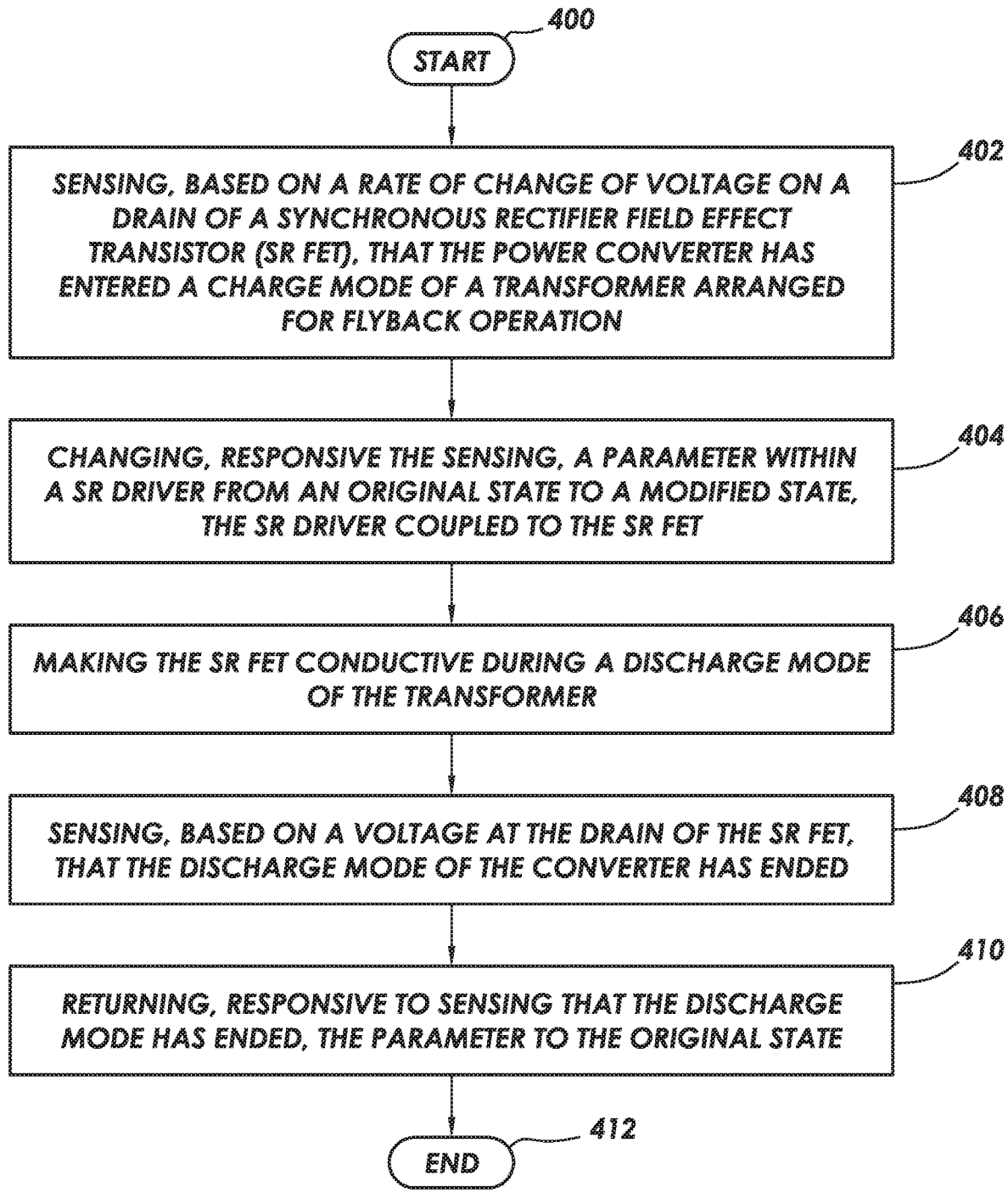
FIG. 4 shows a method in accordance with at least some embodiments.

FIG. 4 shows a method in accordance with at least some embodiments. In particular, the method starts (block 400) and comprises: sensing, based on a rate of change of voltage on a drain of a synchronous rectifier field effect transistor (SR FET), that the power converter has entered a charge mode of a transformer arranged for flyback operation (block 402); and then changing, responsive the sensing, a parameter within a SR driver from an original state to a modified state, the SR driver coupled to the SR FET (block 404); making the SR FET conductive during a discharge mode of the transformer (block 406); sensing, based on a voltage at the drain of the SR FET, that the discharge mode of the converter has ended (block 408); and then returning, responsive to sensing that the discharge mode has ended, the parameter to the original state (block 410). Thereafter, the method ends (block 412) to be restarted on the next charge mode.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter, the method comprising:
   sensing, based on a rate of change of voltage on a drain of a synchronous rectifier field effect transistor (SR FET), that the power converter has entered a charge mode of a transformer arranged for flyback operation; and then
   changing, responsive the sensing, a parameter within a SR driver from an original state to a modified state, the SR driver coupled to the SR FET;
   making the SR FET conductive during a discharge mode of the transformer;
   sensing, based on a voltage at the drain of the SR FET, that the discharge mode of the power converter has ended; and then
   returning, responsive to sensing that the discharge mode has ended, the parameter to the original state.

2. The method of claim 1:
   wherein changing the parameter further comprises increasing a minimum conduction time of the SR FET during discharge modes;
   wherein returning the parameter to the original state further comprises decreasing the minimum conduction time of the SR FET.

3. The method of claim 2 wherein increasing the minimum conduction time of the SR FET further comprises increasing based a resistance of resistor external to and coupled to the SR driver.

4. The method of claim 2 wherein returning the parameter to the original state further comprises returning the minimum conduction time to a predetermined value.

5. The method of claim 2 wherein sensing that the power converter has entered the charge mode further comprises sensing that the rate of change of voltage is positive and above a first predetermined value.

6. The method of claim 1:
   wherein changing the parameter further comprises asserting an armed signal;
   wherein making the SR FET conductive during the discharge mode of the transformer further comprises making the SR FET conductive only if the armed signal is asserted; and
   wherein returning the parameter to the original state further comprises de-asserting the armed signal.

7. The method of claim 6 wherein asserting the armed signal further comprises asserting the armed signal when the rate of change of voltage is positive and the rate of change of voltage is above a first predetermined value.

8. The method of claim 7 wherein de-asserting the armed signal further comprises de-asserted the armed signal when a voltage on the drain rises above a second predetermined value.

9. The method of claim 6 wherein making the SR FET conductive during the discharge mode further comprises:
   monitoring, during periods of time when the armed signal is asserted, a voltage on the drain of the SR FET; and
   making the SR FET conductive when the voltage on the drain indicates a body diode of the SR FET is conducting.

10. A driver for a secondary-side synchronous rectifier, the driver comprising:
    a drain-sense terminal and a gate terminal;
    a controller configured to:
       sense, based on a rate of change of voltage on the drain-sense terminal, the rate of change of voltage indicating a power converter has entered a charge mode of a transformer arranged for flyback operation; and then
       change, responsive to entering the charge mode, a parameter within the driver from an original state to a modified state;
       assert the gate terminal during a discharge mode of the transformer;
       sense, based on a voltage at the drain-sense terminal, that the discharge mode has ended; and then
       return, responsive to sensing that the discharge mode has ended, the parameter to the original state.

11. The driver of claim 10:
wherein when the controller changes the parameter, the controller is configured to increase a minimum conduction time during discharge modes;
wherein when the controller returns the parameter to the original state, the controller is configured to decrease the minimum conduction time.

12. The driver of claim 11 further comprising:
an on-time terminal; and
wherein when the controller increases the minimum conduction time, the controller is further configured to increase based a resistance sensed through the on-time terminal.

13. The driver of claim 11 wherein when the controller returns the parameter to the original state, the controller is configured to return the minimum conduction time to a predetermined value.

14. The driver of claim 11 wherein when the controller senses that the power converter has entered the charge mode, the controller is configured to sense that the rate of change of voltage is positive and above a first predetermined value.

15. The driver of claim 10:
wherein when the controller changes the parameter, the controller is further configured to assert an armed signal;
wherein when the controller asserts the gate terminal during the discharge mode of the transformer, the controller is further configured to assert the gate terminal only if the armed signal is asserted; and
wherein when the controller returns the parameter to the original state, the controller is further configured to de-assert the armed signal.

16. The driver of claim 15 wherein when the controller asserts the armed signal, the controller is further configured to assert the armed signal when the rate of change of voltage is positive and the rate of change of voltage is above a first predetermined value.

17. The driver of claim 15 wherein when the controller de-asserts the armed signal, the controller is further configured to de-assert the armed signal when the rate of change of voltage is positive and a voltage on the drain-sense terminal rises above a second predetermined value.

18. The driver of claim 17 wherein when the controller de-asserts the armed signal, the controller is further configured:
maintain the gate terminal in an asserted state for at least a predetermined on-time; and then
de-assert the armed signal and de-assert the gate terminal when the rate of change of voltage is positive and a voltage on the drain-sense terminal rises above a second predetermined value.

19. The driver of claim 15 wherein the controller is further configure to, during periods when the armed signal is de-asserted, refrain from asserting the armed signal when the rate of change of voltage on the drain-sense terminal indicates a clamp FET on a primary side is made conductive.

20. The driver of claim 19 wherein when the controller refrains, the controller is further configured to:
monitor a voltage on the drain-sense terminal; and
maintain the armed signal de-asserted when the rate of change of voltage is negative and below a first predetermined threshold.

21. The driver of claim 15 wherein when the controller asserts the gate terminal, the controller is further configured to:
monitor, during periods when the armed signal is asserted, a voltage on the drain-sense terminal; and assert the gate terminal when the voltage on the drain-sense terminal indicates a body diode of a synchronous rectifier field effect transistor is conducting.

22. A power converter comprising:
a primary side comprising:
a primary winding of a transformer, the primary winding has a first lead coupled to an input voltage, and a second lead that defines a switch node;
a primary field effect transistor (FET) coupled between the switch node and ground on the primary side;
a clamp FET coupled between the switch node and a clamp capacitor;
a secondary side comprising:
a secondary winding of the transformer arranged for flyback operation;
a secondary rectifier FET (SR FET) defining a drain, a source, and a gate, the drain coupled to the secondary winding;
a driver for SR FET, the driver defining a gate terminal coupled to the gate, and a drain-sense terminal coupled to the drain;
wherein the driver is configured to:
sense, based on a rate of change of voltage on the drain of the SR FET, the rate of change of voltage indicating the power converter has entered a charge mode of the transformer; and then
change, responsive to entering the charge mode, a parameter within the driver from an original state to a modified state;
make SR FET conductive during a discharge mode of the transformer;
sense, based on a voltage at the drain of the SR FET, that the discharge mode has ended; and then
return, responsive to sensing that the discharge mode has ended, the parameter to the original state.

23. The power converter of claim 22:
wherein when the driver changes the parameter, the driver is configured to increase a minimum conduction time of the SR FET during discharge modes;
wherein when the driver returns the parameter to the original state, the driver is configured to decrease the minimum conduction time of the SR FET.

24. The power converter of claim 23 further comprising:
an on-time terminal;
a resistor having a lead coupled to the on-time terminal; and
wherein when the driver increases the minimum conduction time of the SR FET, the driver is configured to increase based a resistance of the resistor.

25. The power converter of claim 23 wherein when the driver returns the parameter to the original state, the driver is configured to return the minimum conduction time to a predetermined value.

26. The power converter of claim 23 wherein when the driver senses that the power converter has entered the charge mode, the driver is configured to sense that the rate of change of voltage is positive and above a first predetermined value.

27. The power converter of claim 22:
wherein when the driver changes the parameter, the driver is further configured to assert an armed signal within the driver;
wherein when the driver makes the SR FET conductive during the discharge mode, the driver is further configured to make the SR FET conductive only if the armed signal is asserted; and wherein when the driver returns the parameter to the original state, the driver is further configured to de-assert the armed signal.

28. The power converter of claim 27 wherein when the driver asserts the armed signal, the driver is further configured to assert the armed signal when the rate of change of voltage is positive and the rate of change of voltage is above a first predetermined value.

29. The power converter of claim 27 wherein when the driver de-asserts the armed signal, the driver is further configured to de-assert the armed signal when the rate of change of voltage is positive and a voltage on the drain of the SR FET rises above a second predetermined value.

30. The power converter of claim 29 wherein when the driver de-asserts the armed signal, the driver is further configured:
   maintain the SR FET in a conductive state for at least a predetermined on-time; and then
   de-assert the armed signal and make the SR FET non-conductive when the rate of change of voltage is positive and a voltage on the drain of the SR FET rises above a second predetermined value.

31. The power converter of claim 27 wherein the driver is further configure to, during periods when the armed signal is de-asserted, refrain from asserting the armed signal when the rate of change of voltage on the drain of the SR FET indicates the clamp FET on a primary side is made conductive.

32. The power converter of claim 31 wherein when the driver refrains, the driver is further configured to:
   monitor a voltage on the drain of the SR FET; and
   maintain the armed signal in a de-asserted state when the rate of change of voltage is negative and below a first predetermined threshold.

33. The power converter of claim 27 wherein when the driver makes the SR FET conductive, the driver is further configured to:
   monitor, during periods when the armed signal is asserted, a voltage on the drain of the SR FET; and
   make the SR FET conductive when the voltage on the drain of the SR FET indicates a body diode of a synchronous rectifier field effect transistor is conducting.

* * * * *